United States Patent
Klein et al.

(10) Patent No.: US 7,017,391 B2
(45) Date of Patent: Mar. 28, 2006

(54) METHOD FOR MEASURING THE LEAKTIGHTNESS OF SEALED CONTAINERS

(75) Inventors: Marton Klein, Ingelheim (DE); Burkhard Metzger, Ingelheim (DE); Bernhard Weitzel, Ingelheim (DE)

(73) Assignee: Boehringer Ingelheim Pharma GmbH & Co KG, Ingelheim (DE)

(*) Notice: Subject to any disclaimer, the term of this patent is extended or adjusted under 35 U.S.C. 154(b) by 12 days.

(21) Appl. No.: 10/662,601

(22) Filed: Sep. 15, 2003

(65) Prior Publication Data

US 2004/0103716 A1   Jun. 3, 2004

Related U.S. Application Data

(60) Provisional application No. 60/458,211, filed on Mar. 27, 2003.

(30) Foreign Application Priority Data

Sep. 17, 2002  (DE) ............................... 102 43 255

(51) Int. Cl.
*G01M 3/04*     (2006.01)
(52) U.S. Cl. ........................................... 73/40.7
(58) Field of Classification Search ............... 73/40.7, 73/38
See application file for complete search history.

(56) References Cited

U.S. PATENT DOCUMENTS

| | | | | |
|---|---|---|---|---|
| 3,342,990 A | * | 9/1967 | Barrington et al. | 250/288 |
| 3,416,359 A | * | 12/1968 | Durbin et al. | 73/40.7 |
| 4,055,984 A | * | 11/1977 | Marx | 73/40.7 |
| 4,803,868 A | * | 2/1989 | Vinton et al. | 73/49.3 |
| 5,228,573 A | * | 7/1993 | Pavelle et al. | 206/459.1 |
| 5,939,619 A | * | 8/1999 | Achter et al. | 73/40.7 |
| 6,067,844 A | * | 5/2000 | Westbrook et al. | 73/40.5 R |
| 6,354,142 B1 | * | 3/2002 | Nothhelfer et al. | 73/49.3 |
| 6,687,622 B1 | * | 2/2004 | Parker | 702/36 |
| 2001/0016059 A1 | * | 8/2001 | Krahn et al. | 382/141 |

FOREIGN PATENT DOCUMENTS

FR      2193478     2/1974
WO  WO 02/059557 A1  8/2002

* cited by examiner

*Primary Examiner*—Michael Cygan

(74) *Attorney, Agent, or Firm*—Michael P. Morris; Thomas C. Blankinship; Mary-Ellen Devlin

(57) ABSTRACT

The present invention relates to a method for reliably and rapidly checking the leaktightness of sealed containers or their leakage rate by the action of a gas thereon. The method according to the invention is particularly suitable for checking the leaktightness of blisters for pharmaceutical formulations of active substance.

13 Claims, 2 Drawing Sheets

METHOD FOR MEASURING THE LEAKTIGHTNESS OF SEALED CONTAINERS

Figure 1:
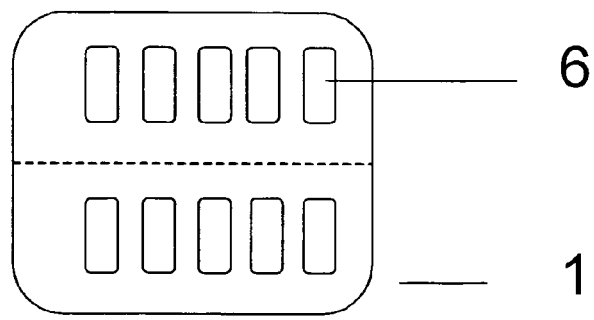

The present invention relates to a method for reliably and rapidly checking the leaktightness of sealed containers or their leakage rate by the action of a gas thereon. The method according to the invention is particularly suitable for checking the leaktightness of blisters for pharmaceutical formulations of active substance.

Prior Art

Foil containers are used to package products safely. In the context of the present invention the term containers relates in particular to primary packaging for pharmaceutical formulations, such as glass containers, metal containers, plastic containers and the like. They are preferably foil containers made essentially of foil. The containers used in the context of the present invention are such that their casing can be perforated at at least one point with a sharp object without totally destroying the container. In particular, the term "containers" refers to pharmaceutical blister packs. Similarly, the process according to the invention can also be used to check cartridges which are used as the active substance reservoir for pharmaceutical liquids in inhalers. Cartridges of this kind are described for example in EP 0532873, WO 96/06011, WO 97/39831, WO 00/23037, WO 00/27543, WO 00/049,988, WO 01/76849, WO 99/43571 or WO 98/46522. Reference is hereby made expressly to the contents of the above mentioned patent applications.

In the pharmaceutical context these foil containers are used, among other things, to protect the pharmaceutical formulations from external environmental influences, which might in some circumstances affect the pharmaceutical quality of the formulation. Moisture (steam) is mentioned as one such environmental influence, in particular. Another function of these containers is to prevent volatile substances from diffusing out of the contents inside the container in the course of storage and thereby altering the pharmaceutical formulation.

If for example tablets, capsules, powders etc are to be protected from moisture they are often welded into blisters which must be leaktight enough to ensure that no water can enter the formulation from outside.

Typical blisters consist of at least two foils which in turn may be constructed of a plurality of layers of different or identical materials. On the one hand there is a base layer or base film and on the other hand there is a covering layer or covering film.

One or more wells may be formed in the base layer in which the pharmaceutical formulation, tablet or tablets or capsule or capsules may be placed. The covering layer is placed over the base layer and attached thereto. The two layers are then tightly joined together, e.g. by adhesive bonding or welding, at least at the edges.

The two layers are generally made of plastic films or metal foils. Other material such as paper may also be used.

Mechanically undamaged blisters do not, however, necessarily protect an active substance formulation embedded therein from the penetration of substances from the outside, such as moisture, for example. Thus, moisture can enter through the top of the blister, the underside or the seam between the covering and base layers by diffusing through the film or foil material.

In addition to diffusion problems of this kind, damage to the blisters may also lead to the product embedded therein coming into contact with moisture. The damage need not be of a macroscopically visible nature but might remain microscopically small.

Liquid formulations may be packaged, for example, in the above mentioned containers and cartridges. These types of packaging should naturally be leaktight enough to ensure that the liquid or ingredients thereof cannot escape or diffuse outwards through the packaging.

Liquid formulations may be used for various pharmaceutical purposes. One purpose is, for example, the administration of liquid formulations for inhalation using certain propellant-free formulations based on water or alcohol. An inhaler of this kind is described for example in WO 97/12687 or WO 91/14468 and is known by the name Respimat®. In connection with this we refer particularly to FIGS. 6a and 6b of WO 97/12687. Cartridges consisting of plastic containers of the type described above may be used in an inhaler of this kind. These containers may be multilayered containers produced by a coextrusion process, e.g. containers with an outer shell of polypropylene and an inner shell of polyethylene, or containers made of metal foil with a flange (WO 99/43571).

There are various methods known in the prior art for determining the leaktightness of foil containers of this kind, either against the penetration of liquids or gases from outside, e.g. moisture in the form of water or water vapour, or liquids or gases escaping from the inside. This is particularly true of blisters.

Thus, for example, a container (e.g. a blister pack) filled with desiccant can be exposed to stress conditions (e.g. 40° C., 75% humidity) and then its leaktightness can be determined by the increased weight of the container over time.

Such processes require several days or even weeks in order to detect low leakage rates (in the range from $1 \times 10^{-6}$ to $1 \times 10^{-7}$ mbar l/s).

In another process a container (e.g. a blister) is sealed under a helium atmosphere, for example. Thus helium is enclosed in the container. The container is then checked for any escape of helium.

This can be done for example by submerging it in a liquid and observing the gas bubbles escaping from the container.

Alternatively, the container, preferably a blister, may be placed in a separate measuring chamber, for example, and then the gas escaping from the container is detected by suitable measuring systems in the measuring chamber.

In this process it is necessary to provide a constant high helium concentration in the container in order to obtain reproducible results, which is not always readily possible in a production process. Moreover, it is only possible to test a container in which helium has been enclosed beforehand.

In another process the container, particularly a blister, produced under normal conditions is enclosed in a pressure-stable larger container ("bomb") which is then filled with gas. The gas used is normally carbon dioxide, helium or krypton. After a certain time the container being investigated is removed from the "bomb". This container is then examined for any escape of gas. This may be done analogously to the above method by submerging it in a hot fluid and observing the gas bubbles escaping from the blister. Alternatively, the blister may for example be placed in a separate measuring chamber, and any gas escaping from the blister is then detected using suitable measuring systems in the measuring chamber.

The usefulness of these last two methods is restricted by the detection limits of the gas in the measuring chamber. In the case of a container which is inherently leaktight, in fact, only a little gas (in the ppm range) can penetrate into the container in both methods and accordingly only a very small amount of gas can escape from the container back into the measuring chamber.

However, in the case of blisters, this process meets its limitations if highly water-sensitive active substances are to be enclosed in the blisters. In fact, this means that correspondingly high demands are made of the leaktight qualities of the containers. In this case these methods of determining leaktightness are unsuitable unless the duration of activity of the gas on the blister in the "bomb" or in the measuring chamber is to be significantly extended, e.g. to several days, the gas pressure in the "bomb" is to be increased or exceptionally sensitive measuring equipment is to be used.

The same applies to other containers.

If such measures are taken, very long measuring periods must be expected and increasing the pressure may lead to damage to the blister.

These processes are unsuitable for rapid leaktightness tests, e.g. as an in-process control during the manufacture of blisters or containers.

Further examples can be found in the literature, e.g. Institute of Electrical and Electronics Engineers, Catalogue No. 85CH2113-9, 1985, page 65; PDA, Journal of Pharmaceutical Science & Technology, Volume 51, No. 5, 1997, pages 187ff and 203ff.

DESCRIPTION OF THE INVENTION

It is therefore an aim of the invention to provide a method of testing the leaktightness of foil containers for pharmaceutical formulations, particularly for blisters, multi-layered plastics cartridges or metal foil cartridges, which do not have the disadvantages of the checking methods known from the prior art.

A further aim is to provide a leaktightness measuring method which can be used alongside the production process, i.e. without interrupting the production process for any length of time.

A further aim is to provide a fast method for measuring leaktightness.

Finally, there is the objective of providing a method of measuring leaktightness which makes it possible to measure very small leaks and is thus highly accurate.

DETAILED DESCRIPTION OF THE INVENTION

The present process according to the invention for checking the leaktightness of sealed containers can be applied to all kinds of containers or other similar vessels and storage means. The preferred containers for the purposes of the present invention are foil containers, particularly pharmaceutical blisters, as described in more detail elsewhere.

In the process according to the invention, first of all in a first step a sealed container with a defined inner space in relation to the volume is acted upon from outside with a gas, in such a way that the gas can penetrate into the interior of the container through the casing of the container or through seams. The term "defined inner space" means an inner space the volume of which is other than 0. The gas may be applied either by the use of excess pressure, using permeation effects with or without the application of excess pressure or by diffusion, while in the latter methods the use of pressure is not absolutely essential. Where the term excess pressure is used within the scope of the present invention this refers to a pressure difference between the pressure inside the container in which the active substance formulation is stored and the pressure of the external environment of the container.

The application of pressure has the advantage that it can speed up the process. The action of gas by diffusion or by using permeation effects without the application of excess pressure is advantageous for containers which are pressure-sensitive. Within the scope of the present invention, including the measurement of the leaktightness of pharmaceutical blisters, it is preferable to operate with the application of pressures.

The rate at which gas can penetrate the container or whether it penetrates it at all depends on various parameters. These parameters include the factors of pressure, the permeation and/or diffusion rate of the material of the container, as mentioned above, in relation to the gas used, the gas itself, the temperature at which the application is carried out and the application time.

In the case of a blister, after the application, the inner space of the blister (e.g. the well) thus contains not only the product which was previously enclosed therein and the gas which it previously contained but also the gas applied. This gas which has penetrated in is sampled and analysed in subsequent steps according to the invention. During the pressurised application the work may be carried out in a so-called bomb or some other chamber suitable for this purpose. In the case of blisters, in particular, the gas is applied at slight overpressure, i.e. at absolute pressures in excess of 1 bar. The upper limit for the application pressure varies depending on the material of the container or blister. The only limiting factor is that the container must not be damaged or pressed in under the pressure applied. In the case of blisters the process is preferably carried out at a pressure difference between the interior of the blister and the outer environment of 0.1 to 10 bar, preferably from 0.5 to 5 bar, while pressure differences between 1 and 2 bar are particularly preferred.

The application time depends on the pressure used. However, the pressure should expediently be selected so that the application time is not more than 5 hours, preferably not more than 3 hours, more preferably not more than 1 hour and most preferably between 1 and 45 minutes.

The gas used for the application may be any desired gas, inert if possible, provided that it is suitable for analysis. Gases which may be used include, for example: hydrogen, water vapour, noble gases such as helium, neon, argon, krypton, carbon dioxide, nitrogen, carbon monoxide, carbon-sulphur gases, sulphur dioxide, hydrogen sulphide, hydrocarbons such as methane or ethane, fluorohydrocarbons such as TG 134a or TG 227, chlorofluorohydrocarbons and the like. The gas used may be such that the quantity which penetrates inside the container can subsequently be quantitatively measured. For pragmatic reasons the gas applied should be a different gas from the one already enclosed in the blister or should differ in quantity therefrom so that it can be analysed qualitatively and/or quantitatively to distinguish it from the gas already present in the container. This choice will make analysis easier.

If, for example, air is enclosed in the container together with the product to be packaged, for reasons of the technical analytical process nitrogen should not be selected as the testing gas as air already contains a great deal of nitrogen. Carbon dioxide, however, may be used as the testing gas in this case. If the product is packaged under an inert gas such as carbon dioxide in the container, carbon dioxide cannot also be used as the test gas.

Preferably, however, pharmaceutical products are packaged in the presence of air and under normal conditions. In this case the testing gas used is preferably one of the noble gases, carbon dioxide or fluorohydrocarbons. Helium is particularly preferred.

The process data mentioned above apply particularly to blisters but may also be applied to other containers. The process according to the invention may be carried out at any temperature at which the material of the container is not damaged. However, as the process is intended to be used on an ongoing packaging process for pharmaceutical formulations it is advisable to choose the temperature so that the pharmaceutical quality of the formulation does not suffer. Preferably, therefore, the work is done at a temperature from 0° C. to 50° C., more preferably between 10° C. and 30° C., and most preferably at ambient temperature.

In the second step of the process after the application of gas has ended the container is carefully opened and a gas sampling device is inserted in the container. This sampling device can remove a small amount of gas from the interior of the container which contains the active substance formulation. The container may be opened by various methods. In the case of blisters, for example, they may be pierced with a suitable device. In the case of other containers they may be pierced or a cap may be opened, a stopper removed, etc. If the blister is pierced the piercing should penetrate deep enough into the blister to provide communication between the external environment and the part of the container in which the active substance formulation is located. It is also possible to pierce it through a septum or the like provided as a sealing means.

The sampling device and the device for piercing the container may be a single device, e.g. a cannula with a tube connected thereto or there may be two devices, e.g. a needle for piercing and a tube for sampling the gas. Preferably, a cannula with tube is used. In a third step the sampled gas is measured qualitatively and preferably also quantitatively.

The gas may automatically be fed to an analyser, e.g. the helium leak detector UL200 made by Messrs Leybold Vacuum. In such cases sampling may be carried out for example with a continuous gas flow of about 0.001 cubic centimetres per second and analysed virtually simultaneously. Preferably, the sampling and analysis take place within less than 5 minutes, preferably within less than 1 minute and most preferably within 30 seconds.

The process according to the invention is capable of determining even low leakage rates from containers in the ppm range within a short time at moderate expense. In the case of blisters, for example, leakage rates of the order of $10^{-4}$ mbar *l/s, preferably less than $10^{-6}$ mbar *l/s, more preferably less than $10^{-8}$ mbar *l/s, in particular. The limits are not restrictive, however, so it is also possible to measure leaks of less than $10^{-10}$ mbar *l/s.

Within the scope of the present invention it is sufficient if the leakage rate from pharmaceutical containers is at most between $10^{-5}$ mbar *l/s and $10^{-9}$ mbar *l/s, preferably $10^{-6}$ mbar *l/s and $10^{-8}$ mbar *l/s. Containers of this kind, particularly blisters, are to be regarded as leaktight for the purposes of this invention.

Within the scope of the present process according to the invention for measuring the leaktightness of containers, blisters are preferably tested. Any kind of blisters may be used, e.g. those described hereinbefore. Preferably the process is applied to pharmaceutical blisters consisting of two or more successive layers or films.

As already mentioned, plastics, metals, paper etc may be used as the materials for the layers of the blister.

Typical metal foils include aluminium foils and composite aluminium foils consisting of aluminium and a plastic, for example.

Suitable materials for the plastic films include PVC (polyvinylchloride), COC (cycloolefin-copolymer, e.g. Topas®), polychlorotrifluoroethylene (e.g. ACLAR®), polyethylene (e.g. as high density polyethylene or low density polyethylene), polypropylene, polyethylene terephthalate, polycarbonates, polyesters, polyacrylates, polyamides or other plastics.

A film may also consist of several layers of the same material or of two or more layers of different materials.

A blister may consist of several layers of the same material or two or more layers of different materials.

Thus, for example, a blister may consist of a covering foil of aluminium which seals off the (thermoforming) film for accommodating the pharmaceutical product made of plastics. This (thermoforming) film is also referred to in the present context as the well film if wells or depressions for accommodating the pharmaceutical formulation are formed in the film. Underneath the (thermoforming) film for accommodating the pharmaceutical product there may also be an aluminium foil as an additional foil to prevent water from entering through the foil into the (thermoforming) film for accommodating the pharmaceutical product, thereby minimising the contact of the pharmaceutical formulation with water. The two aluminium foils may in turn be covered with additional layers of plastic and/or paper so as to form a further diffusion barrier and/or give the blister improved mechanical stability.

The individual layers are welded or stuck together at the edges of the blister. The bonding material for this may be, for example, a heat-sealing lacquer, e.g. based on a polyacrylate and/or polyethylene (e.g. high density and/or low density polyethylene).

Preferably, also, the process according to the invention is used to test containers for liquid pharmaceutical formulations which may be used as cartridges in propellant-free inhalers. The liquid formulations are preferably solutions containing water as the main ingredient of the solvent. Preferably, the process is used for formulations in which the solvent is exclusively water or a mixture of water and a pharmaceutically acceptable alcohol such as ethanol. The process is particularly advantageous if one of the ingredients of the solvent is highly volatile. In addition to formulations in dissolved form containers with formulations in suspended form may also be checked.

The process according to the invention is not restricted to cases where air is enclosed inside the container together with the active substance formulation. The process can also be used if the inner chamber of the container is completely filled with the active substance formulation. If for example the container is completely filled with liquid, the sampling device does not remove a gas sample but takes a liquid sample and subsequently a check is made to see how much gas has dissolved in the fluid. In this case it is sensible to use, as the testing gas, a gas which was not present in the liquid before the test. Alternatively, the liquid may be totally degassed before being transferred into the container or the sealing of said container.

Examples of such containers include a two layer bottle-like container produced by the coextrusion method. This produces an external rigid container, e.g. of polypropylene, and a flexible collapsible inner container provided therein, of polyethylene. The two containers are only mechanically joined together at a few points, e.g. in the neck region or at the bottom. The outer container contains at least one valve opening which allows air to flow in between the outer and inner containers. The inner container is similar to a plastic bag and is able to collapse in on itself when liquid is removed from the inner container from the sealed system under reduced pressure.

The container is then closed off with a cap. Details of a container of this kind with closure cap are described for example in WO 96/06011 and particularly in FIGS. 1 and 4 therein, to the contents of which reference is expressly made herewith.

Another example of a cartridge for propellant-free nebulisers can be found in WO 99/43571, to the contents of which reference is hereby made. In this case the cartridge essentially consists of a bag made of plastics and/or metal foil, e.g. a plastic coated aluminium foil. The bag is sealed off by a weld seam on every side but one. The remaining side is sealed off by a flange. This is preferably made of a plastic. Alternatively, all the sides may be sealed and the flange is applied to the surface of the bag. The flange has a device for piercing with a cannula, so that the cannula can penetrate into the interior of the container.

To protect the bag it may be housed in a metal or plastic sleeve.

Within the scope of the process according to the invention the bag filled with pharmaceutical substance may be pierced, for example, through the casing of the bag in order to remove a sample from the interior. In this case it is advantageous if the bag is not yet enclosed by the protective sleeve. Alternatively the bag may also be opened by sticking a cannula through the flange in order to remove the sample. In this preferred case the container is opened in exactly the same way as is envisaged when it is used in an inhaler.

This form of sampling is also preferred for the testing of the container described above.

Examples of pharmaceutical formulations for the containers which can be tested using the process according to the invention include in principle every kind of formulation. Preferably, containers with pharmaceutical compositions for administering by inhalation are tested. The pharmaceutical compositions are preferably active substances from the categories of the anticholinergics, antihistamines, antiallergics, leukotriene antagonists and/or steroids. Combined formulations may also be used.

These active substances include:

As betamimetics:

bambuterol, bitolterol, carbuterol, clenbuterol, fenoterol, formoterol, hexoprenaline, ibuterol, pirbuterol, procaterol, reproterol, salbutamol, salmeterol, sulfonterol, terbutaline, tulobuterol, 1-(2-fluoro-4-hydroxyphenyl)-2-[4-(1-benzimidazolyl)-2-methyl-2-butylamino]ethanol, erythro-5'-hydroxy-8'-(1-hydroxy-2-isopropylaminobutyl)-2H-1,4-benzoxazin-3-(4H)-one, 1-(4-amino-3-chloro-5-trifluoromethylphenyl)-2-tert.-butyl-amino)ethanol. 1-(4-ethoxycarbonylamino-3-cyano-5-fluorophenyl)-2-(tert.-butylamino)ethanol.

as anticholinergics:

benzilic acid-N-β-fluoroethylnortropine ester methobromide, ipratropium bromide, oxitropium bromide, tiotropium bromide, tiotropium bromide-monohydrate, trospium chloride.

as antiallergics:

disodium cromoglycate, epinastin, nedocromil.

as steroids:

alclometasone, alclometasone-dipropionate, alisactide, amcinonide, aminoglutethimide, aristocort-diacetate, beclometasone, Douglas, beclometasone, beclometasone-17, 21-dipropionate, betamethasone valerate, betamethasone adamantoate, budesonide, butixocort, canesten-HC, ciclometasone, clobetasol, clobetasone, cloprednol, cloprednol, cortivazol, deflazacort , fluocortin butyl, demetex, deprodone, deprodone propionate, dexamethasone, dexamethasone-21-isonicotinate, dexamethasone isonicotinate, diflorasone, difluprednate, endrisone, fluazacort, fluclorolone acetonide, flunisolide, fluocinolone acetonide, fluocinonide, fluocortin, fluocortolone capronate, fluodexan, fluorometholone, fluticasone, fluticasone-propionate, formebolone, formocortal, halcinonide, halometasone, halopredone-acetate, hydrocortisone, hydrocortisone-17-butyrate, hydrocortisone-aceponate, hydrocortisone-butyrate propionate, icomethasone enbutate ciclometasone, lotrisone, mazipredone, medrysone, meprednison, methylprednisolone-aceponate, mometasone furoate, mometasone, montelukast, mycophenolate mofetil, pranlukast, paramethasone-acetate, prednicarbate, promedrol, seratrodast, tipredan, tixocortol-pivalate, triamcinolone, triamcinolone-hexacetonide, trilostane, trimacinolone benetonide, ulobetasol-propionate, zileuton, 9-alpha-chloro-6-alpha-fluoro-11-beta-17-alpha-dihydroxy-16-alpha-methyl-3-oxo-1,4-androstadiene-17-beta-carboxy acid-methylester-17-propionate.

The above mentioned active substances may also be used in the form of other pharmacologically acceptable salts, addition products, sulphates, etc.

The process according to the invention is preferably used for containers with the above mentioned active substances or combinations thereof but is not restricted to these active substances.

The advantages of the process claimed include, among other things:

During the production process any foil container from the current production run can be tested, the process does not involve any complicated handling, the processing time is relatively short, the step which determines the speed being the time over which the gas acts on the container the production process does not have to be interrupted with known blister geometries the leakage rate can be automatically detected straight away, the detection limits for leakages are very low.

Figure 2:
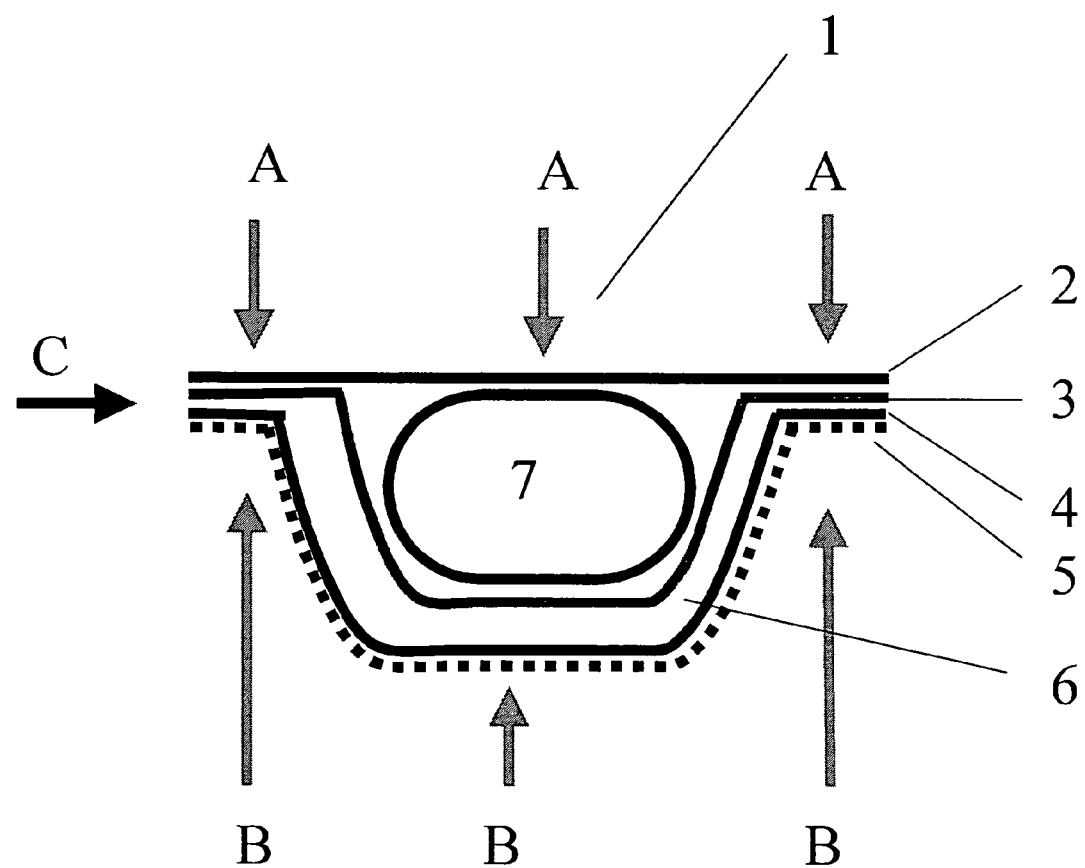

Some typical containers to which the process according to the invention can be applied will be described hereinafter. Blisters as shown in FIGS. 1 and 2 are most preferred. FIG. 1 shows a typical blister (1) within the scope of the present invention having a number of wells or cavities (6), viewed in plan view.

FIG. 2 shows a cross section through a blister, showing only one well (6). The blister consists of a covering layer (2), then for example a thermoforming film with a plurality of non-communicating wells (3) for receiving the pharmaceutical product, a lower layer of indentations (4) and the protective layer (5) around the layer of indentations (4). The arrows A indicate the covering layer (2) and are intended to show the route by which moisture diffuses through the covering layer. The arrows B point to the base layer (3, 4, 5) and are intended to show the route by which moisture diffuses through the base layer.

Arrow C indicates the join between the covering and base layers and the route which moisture can take through this part of the blister.

Within the scope of the present invention blisters with the following sequence of layers are preferred:

A covering film consisting of a first covering layer (i.e. outermost covering layer) of paper (20 to 100 g/m$^2$) or lacquer (0.5 to 3 g/m$^2$), a second covering layer (2) of polyethylene terephthalate underneath it, preferably in a thickness of 5 to 20 microns, more preferably 10 to 15 microns, and finally a layer of aluminium foil with a preferred thickness of 10 to 60 microns, preferably 10 to 50 microns and most preferably 15 to 40 microns.

Underneath this is the film for accommodating the pharmaceutical product (3), which is formed for example from a three-ply film (4) with a preferred thickness of 30 to 500 microns, more preferably 60 to 300 microns. This film consists initially of a PVC layer on the side in contact with the product, the thickness of which is preferably 10 to 200 microns, more preferably 35 to 70 microns, then an aluminium layer the thickness of which is preferably 30 to 60 microns, more preferably 35 to 50 microns. This aluminium layer is in turn covered by a layer of polyamide which is preferably 10 to 40 microns thick, more preferably 20 to 30 microns thick.

Individual layers such as the paper layer may be omitted. Any heat-sealing lacquers or adhesive agents required are not included here, in the interests of simplicity.

The most preferred blister consists of three films or foils. First of all a covering film of a 30 micron thick covering layer of aluminium, then an indented film of PVC, 250 microns thick, for accommodating the pharmaceutical product, and an underlying film of foil consisting of a layer of aluminium 45 microns thick and a final layer of polyamide on the bottom, 25 microns thick.

Figure 3:
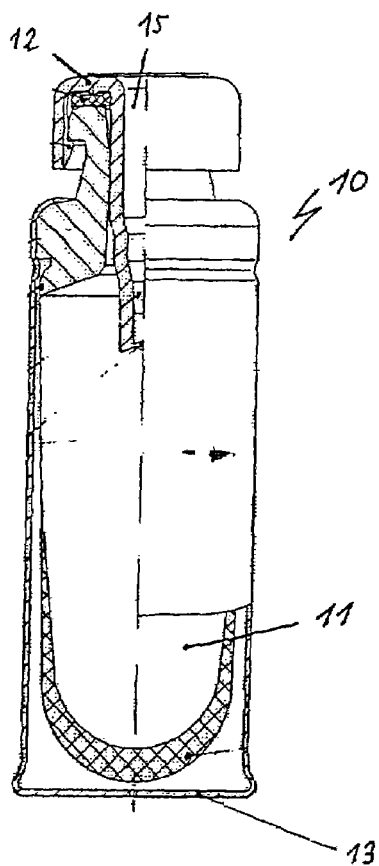

FIG. 3 shows an inhaler cartridge (10) consisting of a bag (11) of a metal and/or plastics film and a flange (12). In this case the bag may be protected by a sleeve (13) of metal or plastics. The flange is firmly sealed. It preferably has a sealed guiding channel (15) for a cannula and a press-fit or seal which seals off any cannula penetrating through it and opening the channel. The cannula may be the cannula of the Respimat® inhaler which has already been mentioned several times, with which a small amount of liquid can be removed from the container. This container is also described in detail in WO 99/43571. The bag may be accommodated in a metal sleeve fixedly attached to the bag via the flange (FIG. 12 in WO 99/43571).

Figure 4:
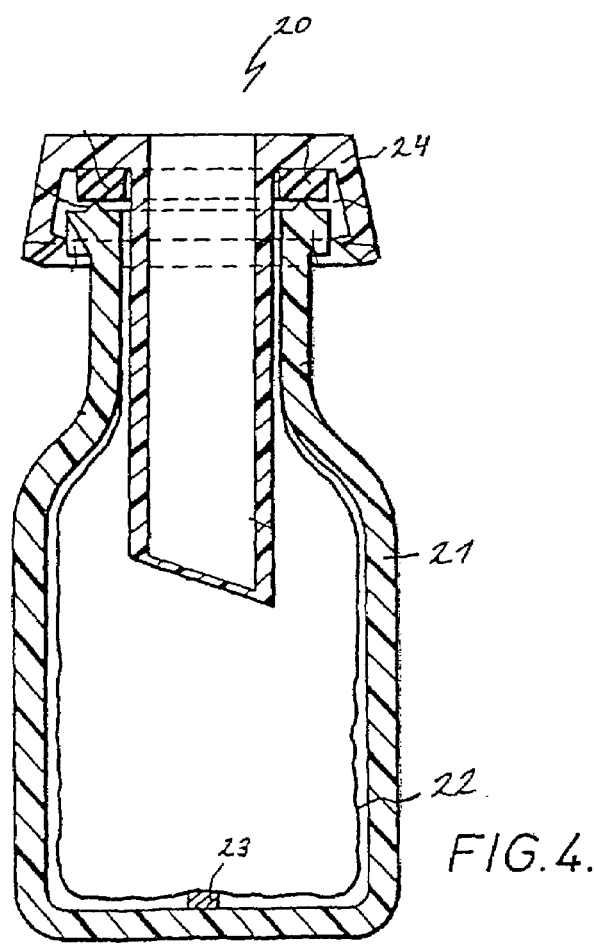

FIG. 4 shows a cartridge for the above-mentioned Respimat® inhaler (WO 91/14468 and WO 97/12687, particularly FIGS. 6a and 6b, to which reference is hereby made in their entirety.

The Figure shows an axial section through a container (20) suitable for the process according to the invention.

In a preferred embodiment the container (20) consists of a dimensionally stable outer container (21) and an easily deformable inner bag (22).

The container is sealed off by a cap (24).

Containers of this kind are described for example in European Patent 532873, to the contents of which reference is hereby made. The apparatus (23) serves to secure the deformable inner bag (22) to the inner wall of the external rigid container (21) facing the bag (22). This container is also described in detail in WO 96/06011.

However, the invention is not restricted to the above-mentioned blisters or cartridges but the process can be applied to any desired containers.

What is claimed is:

1. An in-procces control method in a production run of an on-going packaging process for pharmaceutical formulations to test the leaktightness of a sealed container that holds a pharmaceutical active substance formulation in a chamber, the method comprising the steps of: a) acting upon the sealed container with a gas such that any increase of the gas inside the chamber can be analyzed; b) removing a sample from the chamber; and c) analyzing the sample for the presence of the gas, wherein the sealed container is a sealed, two-layer, container with a rigid outer shell and an inner container mechanically attached to the outer shell only at certain points and able to collapse in on itself relative to the outer container.

2. The method according to claim 1, wherein the sealed, two-layer, container has been produced by a coextrusion process.

3. The method according to claim 1, wherein the rigid outer shell consists of polypropylene, and the inner container consists of polyethylene.

4. The method according to claim 1, wherein the step of acting upon the sealed container with the gas is carried out at a pressure difference between the chamber and the gas of 0.1 to 10 bar.

5. The method according to claim 4, wherein the pressure difference is between 0.5 to 5 bar.

6. The method according to claim 5, wherein the pressure difference is between 1 and 2 bar.

7. The method according to claim 1, wherein the gas is acted upon the sealed container at a pressure difference of about zero between the chamber and the gas by permeation effects, diffusion, or permeation effects and diffusion.

8. The method according to claim 1, wherein the gas is selected from the group consisting of: hydrogen, water vapor, noble gases, carbon dioxide, nitrogen, carbon monoxide, carbon-sulfur gases, sulfur dioxide, hydrogen sulfur, hydrocarbons, fluorohydrocarbons, chlorofluorohydrocarbons, and mixtures thereof.

9. The method according to claim 8, wherein the gas is helium.

10. The method according to claim 1, wherein the steps of opening the sealed container and removal of the gas sample are carried out in a single step.

11. The method according to claim 1, carried out at a temperature of 0° C. to 50° C.

12. The method according to claim 1, wherein the inner container comprises a flange, and wherein the rigid outer shell is a metal or plastic sleeve.

13. The method according to claim 12, wherein the inner container comprises a metal foil, a plastic film, or a plastic-coated metal foil.

* * * * *